(12) United States Patent
Miller et al.

(10) Patent No.: US 7,778,808 B2
(45) Date of Patent: Aug. 17, 2010

(54) GEOSPATIAL MODELING SYSTEM PROVIDING DATA THINNING OF GEOSPATIAL DATA POINTS AND RELATED METHODS

(75) Inventors: Stephan Walker Miller, Melbourne, FL (US); J. Harlan Yates, Melbourne, FL (US); Stephen Connetti, Melbourne, FL (US); Mark Rahmes, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 705 days.

(21) Appl. No.: 11/739,166

(22) Filed: Apr. 24, 2007

(65) Prior Publication Data

US 2008/0270031 A1 Oct. 30, 2008

(51) Int. Cl.
*G06F 17/50* (2006.01)
*G06N 5/02* (2006.01)

(52) U.S. Cl. ............... 703/2; 700/66; 382/154; 382/174; 706/13; 706/46; 702/5

(58) Field of Classification Search .......... 703/1, 703/2; 706/13, 46; 382/154, 174; 702/5
See application file for complete search history.

(56) References Cited

U.S. PATENT DOCUMENTS

| | | | | |
|---|---|---|---|---|
| 5,493,494 | A * | 2/1996 | Henderson | 701/50 |
| 5,764,511 | A * | 6/1998 | Henderson | 700/66 |
| 6,654,690 | B2 | 11/2003 | Rahmes et al. | 702/5 |
| 6,985,929 | B1 * | 1/2006 | Wilson et al. | 709/217 |
| 2007/0269102 | A1 * | 11/2007 | Wang | 382/154 |
| 2008/0262988 | A1 * | 10/2008 | Williams et al. | 706/13 |

OTHER PUBLICATIONS

Van Kreveld, "Digital Elevation Models and TIN Algorithms", Lecture Notes in Computer Science, 1997, pp. 37-78.
Montenegro Et Al., "Error Measures in Greedy Insertion Simplification Methods", Computer Graphics, Image Processing, and Vision, Oct. 20-23, 1998, pp. 78-85.
Lee Et Al., "Taxonomy of Space Tesselation", ISPRS Journal of Photogrammetry & Remote Sensing, No. 55, 2000, pp. 139-149.
Zech et al., *Modeling and Visualizing the Cultural Heritage Data Set of Graz*, Association for Computing Machinery, 2002.
Balmelli et al., *Progressive Mesh Decomposition in the Operational Rate-Distortion Sense Using Global Error*, Proceedings of the 10th International Meshing Roundtable, Oct. 1991.

(Continued)

*Primary Examiner*—Thai Phan
(74) *Attorney, Agent, or Firm*—Allen, Dyer, Doppelt, Milbrath & Gilchrist, P.A.

(57) ABSTRACT

A geospatial modeling system may include a geospatial database for storing geospatial data points each having respective elevations associated therewith. The system may further include a processor for data thinning the geospatial data points by selecting discriminant points therefrom. The processor may select discriminant points based upon: (a) identifying a current patch having a plurality of spaced-apart current geospatial data boundary points; (b) selecting a current discriminant point within the current patch based upon sequentially stepping through the geospatial data points therein to determine respective elevation differences relative to the current geospatial boundary points and comparing the elevation differences to a threshold range; (c) identifying a plurality of new patches, each having a plurality of spaced-apart new geospatial boundary points including the current discriminant point; and (d) iteratively repeating steps (b) and (c) for each of the new patches until no further new discriminant point is selected.

17 Claims, 8 Drawing Sheets

OTHER PUBLICATIONS

DEMScape: Approximating Digital Elevation Models, available at www.amber.rc.arizona.edu/lw/demscape.html.

Gavrilova, *Mesh Optimization*, Department of Computer Science, University of Calgary, Calgary, Alberta.

* cited by examiner

GEOSPATIAL MODELING SYSTEM PROVIDING DATA THINNING OF GEOSPATIAL DATA POINTS AND RELATED METHODS

FIELD OF THE INVENTION

The present invention relates to the field of topographical modeling, and, more particularly, to geospatial modeling systems and related methods.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types of and methods for making topographical models are presently being used. One common topographical model is the digital elevation model (DEM). A DEM is a sampled matrix representation of a geographical area which may be generated in an automated fashion by a computer. In a DEN, coordinate points are made to correspond with a height value.

Conventional DEMs are typically used for modeling terrain where the transitions between different elevations (e.g., valleys, mountains, etc.) are generally smooth from one to a next. That is, DEMs typically model terrain at spacings of 0-30 meters presently and as a plurality of curved surfaces and any discontinuities therebetween are thus "smoothed" over. Thus, in a typical DEM no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and Light Detection and Ranging (LIDAR), for example.

Another advantageous approach for generating 3D site models is set forth in U.S. Pat. No. 6,654,690 to Rahmes et al., which is also assigned to the present Assignee and is hereby incorporated herein in its entirety by reference. This patent discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

One potentially challenging aspect of generating geospatial models such as DEMS is that high resolutions (i.e., data point or post spacing of $\leq 1$ m) are becoming the norm for terrain representation. As the density of data points in high resolution DEMS (HRDEMs) increases, so too does the volume of data generated for such models. The size of these models can be extremely burdensome to even the most powerful geospatial data processing computers in some applications.

Various approaches are sometimes used to decrease the size of a data field, such as HRDEM data. One approach is to increase the frequency of sampling. However, this may result in other problems requiring labor and time intensive manual editing. Various automated approaches have also been proposed for DEM data thinning, such as simple decimation (e.g., every 5th post is selected), local operators (e.g., a 3×3 filter), and global greedy insertion methods. Yet, these approaches may have certain drawbacks as well. For example, simple decimation of points with DEMs frequently creates artifacts by missing tops and bottoms of geographic features. Moreover, local operators alone can miss areas where gradual changes in height accumulate to a significant point. Additionally, traditional global greedy insertion methods are typically computer-intensive and may not provide desired performance on LIDAR data surveys, for example.

SUMMARY OF THE INVENTION

In view of the foregoing background, it is therefore an object of the present invention to provide a system and related methods for generating geospatial models with desired detail and reduced data sizes and related methods.

This and other objects, features, and advantages are provided by a geospatial modeling system that may include a geospatial database for storing geospatial data points each having respective elevations associated therewith. The system may further include a processor for data thinning the geospatial data points by selecting discriminant points therefrom. More particularly, the processor may select discriminant points based upon: (a) identifying a current patch having a plurality of spaced-apart current geospatial data boundary points; (b) selecting a current discriminant point within the current patch based upon sequentially stepping through the geospatial data points therein to determine respective elevation differences relative to the current geospatial boundary points and comparing the elevation differences to a threshold range; (c) identifying a plurality of new patches, each having a plurality of spaced-apart new geospatial boundary points including the current discriminant point; and (d) iteratively repeating steps (b) and (c) for each of the new patches until no further new discriminant point is selected.

In particular, the processor may further generate a geospatial model based upon the discriminant points. By way of example, the geospatial model may be a tiled triangulated irregular network (T-TIN) geospatial model. Moreover, the processor may further select vertical points using a local slope operator (LSO). As such, the processor may further generate the geospatial model based upon the selected vertical points. More specifically, the processor may determine the selected vertical points in an initial pass prior to selecting the discriminant points.

The processor may determine the elevation differences based upon weighted bilinear processing, for example. Also by way of example, the geospatial boundary points for a given patch may be four in number so that the patch has a rectangular shape. In addition, the threshold range may include an upper threshold and a lower threshold. Furthermore, the geospatial modeling system may also include a display operatively connected to the processor. Additionally, the geospatial data may comprise Light Detecting and Ranging (LIDAR) data, for example.

A geospatial modeling method aspect may include providing geospatial data points each having respective elevations associated therewith, and data thinning the geospatial data points. More particularly, the geospatial data points may be thinned by: (a) identifying a current patch having a plurality of spaced-apart current geospatial data boundary points; (b) selecting a current discriminant point within the current patch based upon sequentially stepping through the geospatial data points therein to determine respective elevation differences relative to the current geospatial boundary points and comparing the elevation differences to a threshold range; (c) identifying a plurality of new patches, each having a plurality of spaced-apart new geospatial boundary points including the current discriminant point; and (d) iteratively repeating steps (b) and (c) for each of the new patches until no further new discriminant point is selected.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
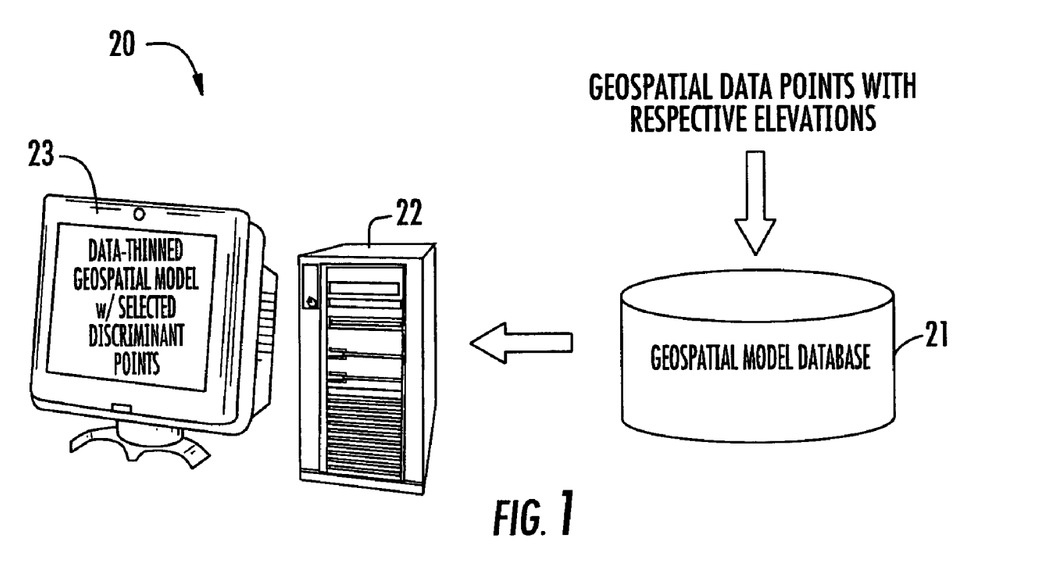
FIG. 1 is a schematic block diagram of a geospatial modeling system in accordance with the invention.

Referring initially to FIG. 1, a geospatial modeling system 20 illustratively includes a geospatial database 21 for storing geospatial data points each having respective elevations associated therewith. By way of example, the geospatial data points may be captured using various techniques, such as stereo optical imagery, Light Detecting And Ranging (LIDAR), Interferometric Synthetic Aperture Radar (IFSAR), etc., as will be appreciated by those skilled in the art.

As noted above, it is often desirable to "thin" a large set of data points for a given geographic area to reduce the processing and memory resources required for generating and displaying a DEN for the area. To this end, the system 20 also advantageously includes a processor 22 for data thinning the geospatial data points. By way of example, the processor 22 may be a central processing unit (CPU) of a PC, Mac, or other computing workstation, for example. A display 23 is also operatively coupled to the processor 22 in the illustrated embodiment for displaying geospatial modeling data, as will be discussed further below.

Figure 2:
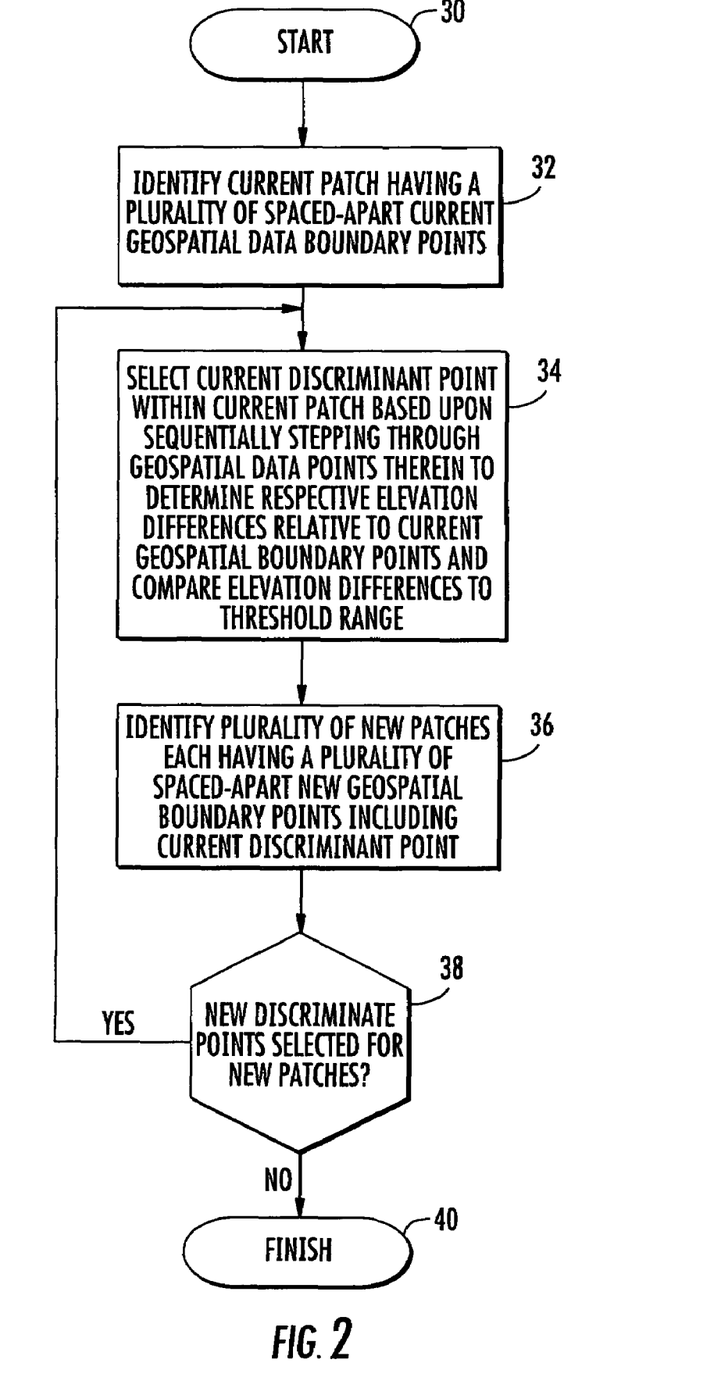
FIGS. 2 and 3 are flow diagrams of geospatial modeling methods in accordance with the invention.
Figure 3:
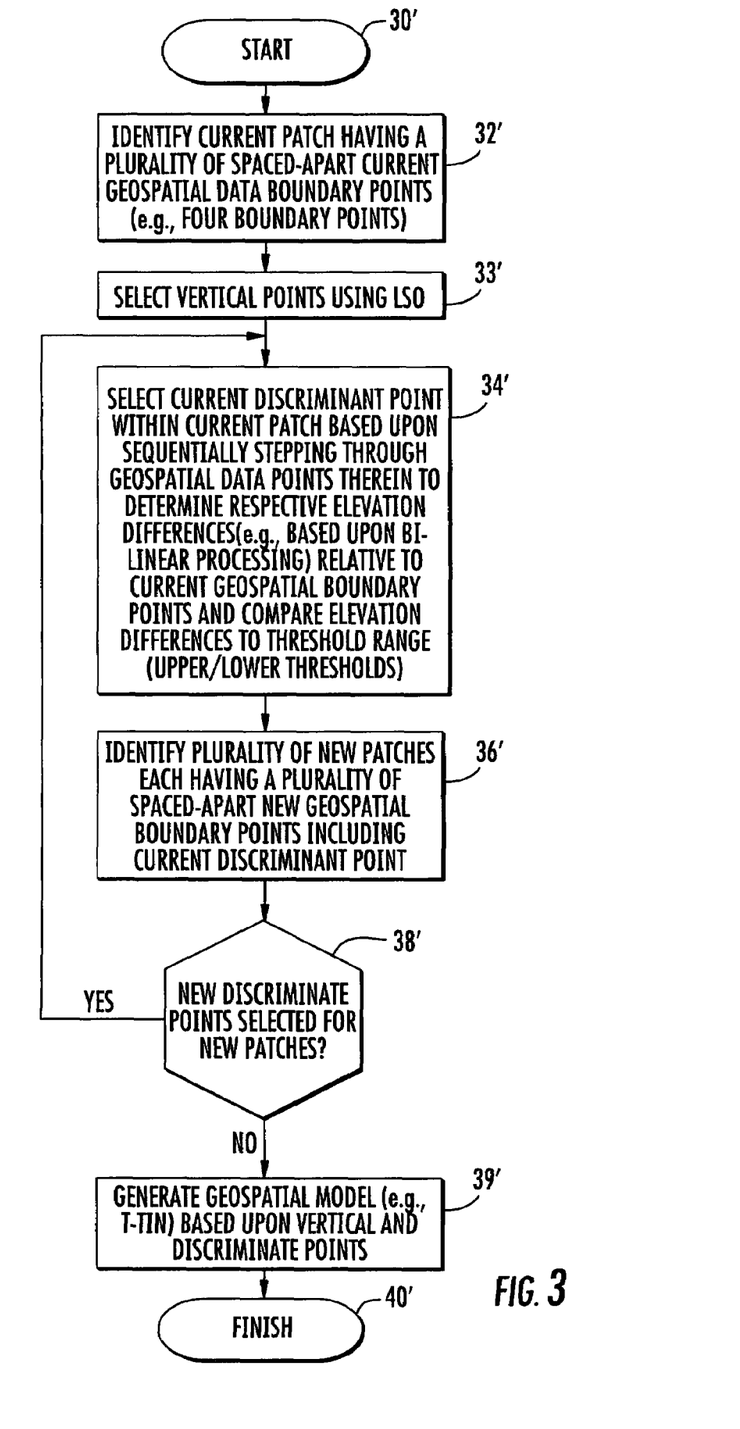
Figure 4:
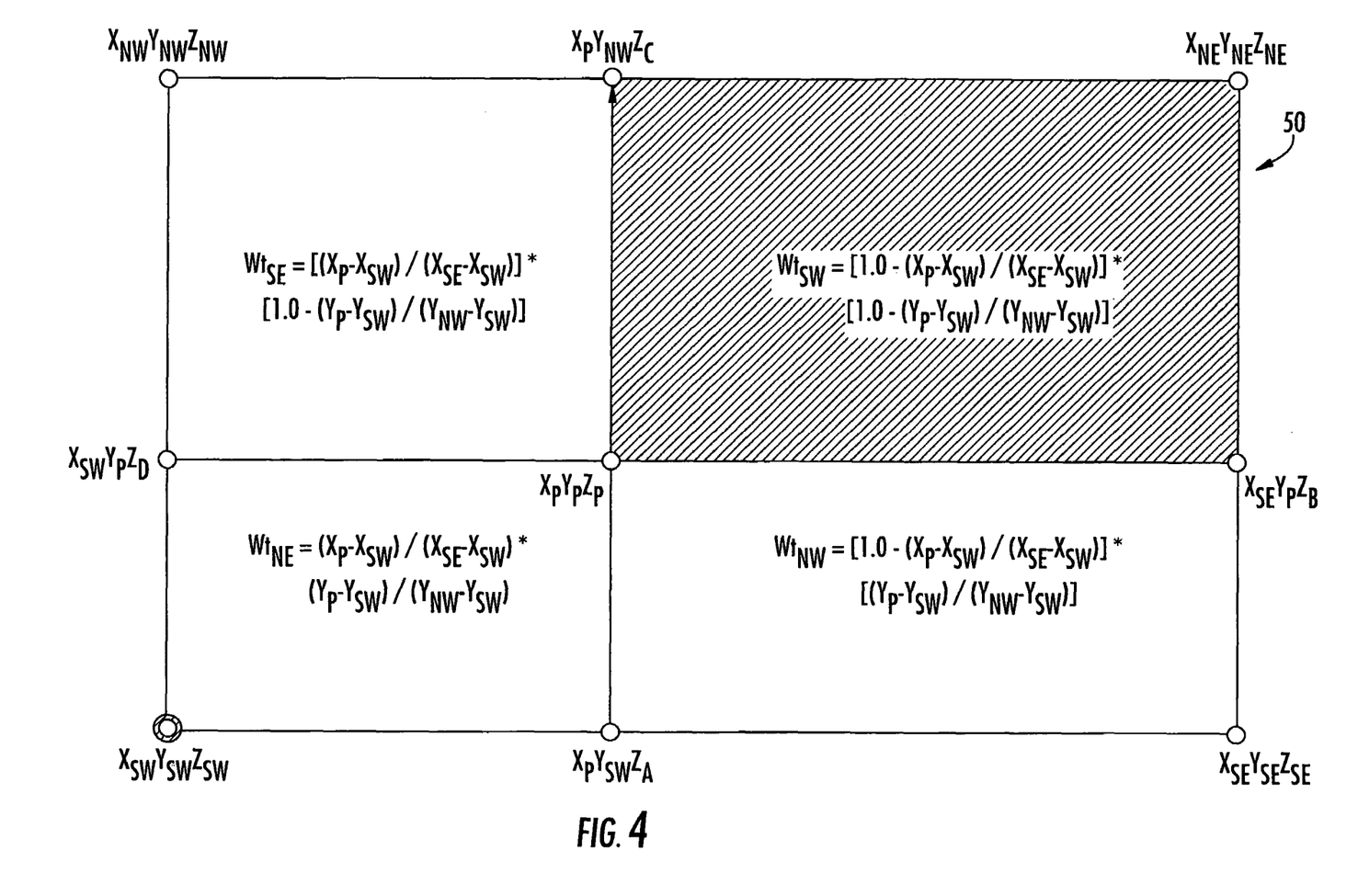
FIGS. 4-5 are schematic diagrams of geospatial data point patches determined using the method of FIG. 2.

Turning now additionally to FIGS. 2-4, methods utilized by the processor 22, for example, for data thinning the geospatial data points are now described. Beginning at Block 30, a current patch 50 is identified from among the geospatial data points that has a plurality of spaced-apart current geospatial data boundary points $X_{NW}Y_{NW}Z_{NW}$, $X_{NE}Y_{NE}Z_{NE}$, $X_{SW}Y_{SW}Z_{SW}$, $X_{SE}Y_{SE}Z_{SE}$, at Block 32. Depending upon the size of the particular geographic area represented by the set of geospatial data points, the current patch 50 could encompass the entire data set, or the data set could be tiled into different patches to avoid paging issues and improve processing performance if the data set is particularly large, as will be appreciated by those skilled in the art. In the present example, the current patch is defined by four geospatial data boundary points $X_{NW}Y_{NW}Z_{NW}$, $X_{NE}Y_{NE}Z_{NE}$, $X_{SW}YX_{SW}ZX_{SW}$, $X_{SE}Y_{SE}Z_{SE}$ to define a rectangular (or square) patch (Block 32'). However, it should be noted that other numbers of boundary points may be used in different embodiments to define different patch shapes, if desired.

Once the current patch 50 is identified, a current discriminant point $X_PY_PZ_P$ is selected within the current patch based upon sequentially stepping through the geospatial data points therein to determine respective elevation differences relative to the current geospatial boundary points $X_{NW}Y_{NW}Z_{NW}$, $X_{NE}Y_{NE}Z_{NE}$, $X_{SW}YX_{SW}ZX_{SW}$, $X_{SE}Y_{SE}Z_{SE}$, and comparing the elevation differences to a threshold range, at Block 34. More particularly, the highest or lowest discriminant point based upon height difference ($\Delta z$) within the current patch 50 is determined based upon a weighted bilinear estimate from the four corners including edges (Block 34').

One exemplary weighting approach is illustrated in FIG. 4. The weight applied to the z-value at corner point $X_{SW}Y_{SW}Z_{SW}$ (which is shaded with hatching in FIG. 4) is proportional to the area of the diagonal sub-rectangle from a given point $X_PY_PZ_P$ to $X_{NE}Y_{NE}Z_{NE}$ (also shown with hatching in FIG. 4) over the entire area of the current rectangular patch 50. Similar weighting is also used for the other corner points $X_{NW}Y_{NW}Z_{NW}$, $X_{NE}Y_{NE}Z_{NE}$, and $X_{SE}Y_{SE}Z_{SE}$, as will be appreciated by those skilled in the art.

In the illustrated example, the given point $X_PY_PZ_P$ is the discriminant point for the current patch 50, in that it has the highest $\Delta z$ (which could either be a positive height value or a negative height value relative to the boundary points $X_{NW}Y_{NW}Z_{NW}$, $X_{NE}Y_{NE}Z_{NE}$, $X_{SW}Y_{SW}Z_{SW}$, $X_{SE}Y_{SE}Z_{SE}$) with respect to the remaining points in the patch. However, even though this point has a greater $\Delta z$ than the remaining points in the patch 50, it may still not be statistically significant enough to warrant selection for display in the final DEM (e.g., T-TIN). Accordingly, the discriminant point $X_PY_PZ_P$ is only selected if its value meets the specified threshold range, which may be defined by upper and lower threshold values.

More particularly, the $\Delta z$ value need either be less than or equal to the lower threshold, or greater than or equal to the upper threshold for the point $X_PY_PZ_P$ to be considered statistically significant for selection. One approach is that a single vertical error threshold e can be used such that if the absolute value of $\Delta z$ of the discriminant point $X_PY_PZ_P$ is greater than or equal to the vertical error e, then the point is selected (i.e., marked as critical or statistically significant). However, it should be noted that the upper and lower threshold values could be different in some embodiments.

Figure 9A:
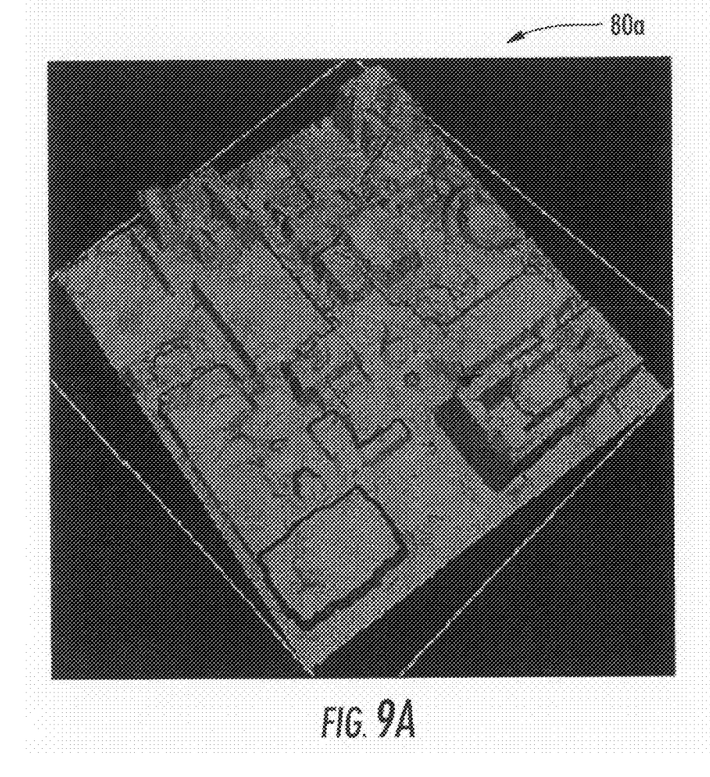
Figure 9B:
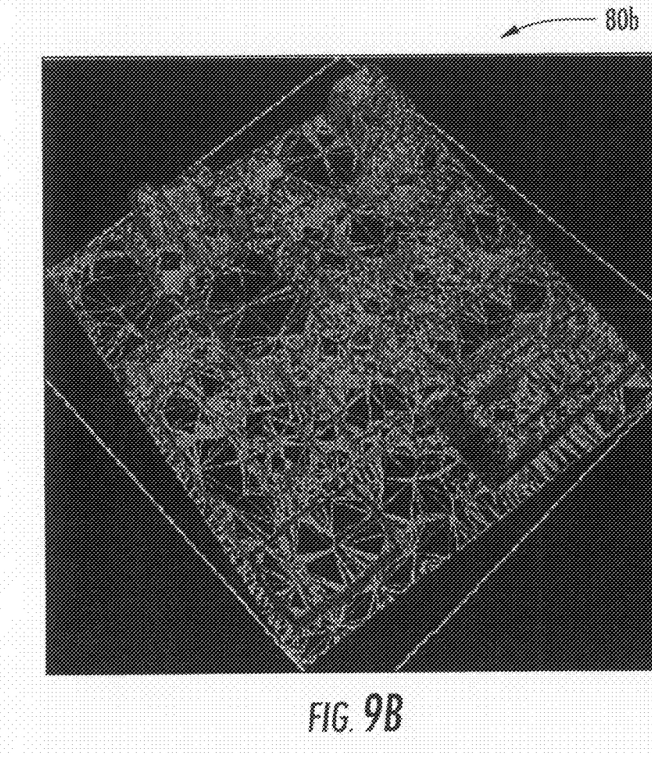

The selection of the vertical error threshold e and/or upper/lower threshold values will typically depend upon the type of terrain being modeled. For example, for relatively flat areas the threshold(s) may be chosen to be smaller so that more minute details are provided. On the other hand, for cities or mountain ranges relatively small elevation changes may not be particularly important, so the threshold(s) may potentially be set to higher values, as will be appreciated by those skilled in the art. By way of example, for the T-TINs shown in FIGS. 9A and 9B, a vertical error e of 1.0 meters was used, but again other thresholds may also be used.

Once the discriminant point $X_P Y_P Z_P$ is determined to be statistically significant (i.e., critical) based upon the threshold range, as discussed above, then this point is used to identify or define a plurality of new patches (i.e., sub-patches) within the current patch 50, at Block 36. More particularly, a vertical line and horizontal line (i.e., respectively parallel to the x and y axes) are drawn through the discriminant point $X_P Y_P Z_P$ to define new boundary points $X_P Y_{NW} Z_C$, $X_{SW} Y_P Z_D$, $X_{SE} Y_P Z_B$, and $X_P Y_{SW} Z_A$ for the sub-patches. More particularly, the boundary points for each of the new patches are: (1) $X_{NW} Y_{NW} Z_{NW}$, $X_P Y_{NW} Z_C$, $X_{SW} Y_P Z_D$, and $X_P Y_P Z_P$; (2) $X_P Y_{NW} Z_C$, $X_{NE} Y_{NE} Z_{NE}$, $X_P Y_P Z_P$, and $X_{SE} Y_P Z_B$; (3) $X_{SW} Y_P Z_D$, $X_P Y_P Z_P$, $X_{SW} Y_{SW} Z_{SW}$, and $X_P Y_{SW} Z_A$; and (4) $X_P Y_P Z_P$, $X_{SE} Y_P Z_B$, $X_P Y_{SW} Z_A$, and $X_{SE} Y_{SE} Z_{SE}$. As seen in FIG. 4, each of these new patches includes the discriminant point $X_P Y_P Z_P$ of the patch 50 as one of its boundary points.

Figure 5:
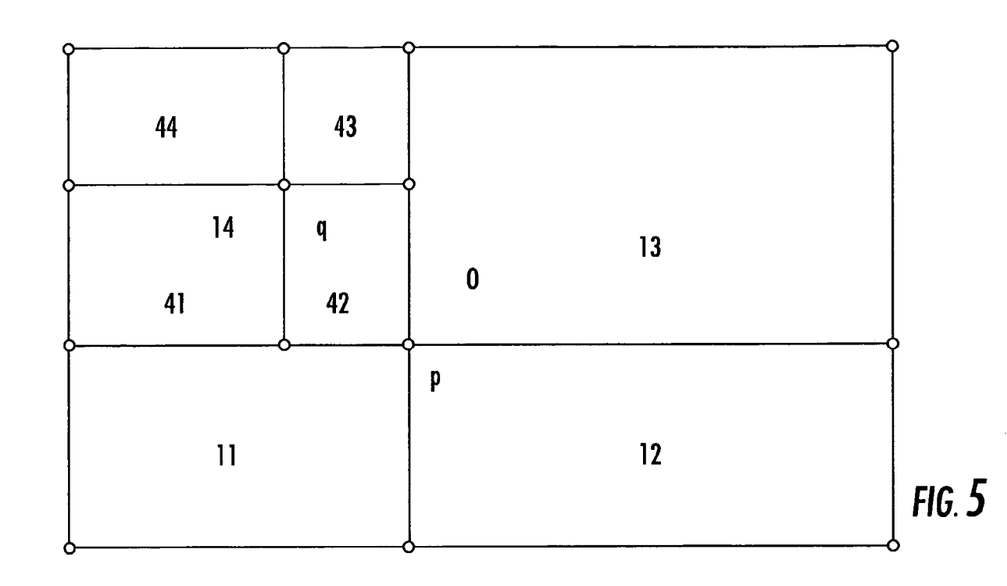

Once the four new patches are identified, then the above-described discriminant point determination and selection process described above with reference to Blocks 34 and 36 is repeated for each new patch. This may, in turn, result in the creation of four new patches within one or more of the four (now) current patches, as illustrated in FIG. 5. Here, an original patch 60 is first subdivided into new patches 11-14 based upon a selected discriminant point p within the original patch. Then, the discriminant point selection process is repeated for the patch 14, which results in the selection of a new discriminant point q for this patch, so that patch 14 is then sub-divided into new patches 41, 42, 43, and 44, as shown. This process continues until no discriminant point is selected for a current patch, at which point processing moves to another patch until processing of all of the patches is complete, thus concluding the discriminant point selection process, at Block 40.

Figure 6:
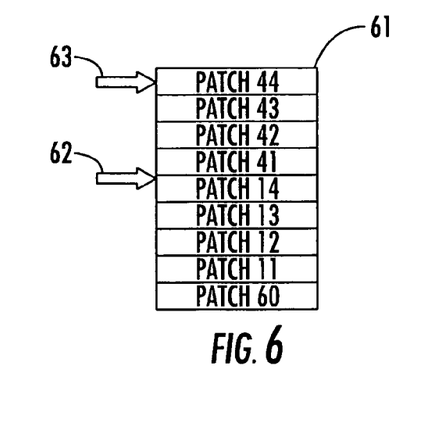
FIG. 6 is a schematic block diagram of a processing stack used for discriminant point selection in the example of FIG. 5.

One exemplary order of processing the various patches identified during the discriminant point selection is shown in FIG. 6. Processing initially beings with the patch 60, which is the first (i.e., bottom) item on the illustrated processing stack 61. Once the new patches 11-14 are identified, then these patches are added to the stack 61 and processing of the patch 14 begins as shown by the pointer 62. Yet, once it is determined that patch 14 has a discriminant point q to be selected, then the four new patches 41-44 are identified and processing moves to the patch 44, as indicated by the pointer 63.

Once processing of the patch 44 is completed (either because there is no discriminant point to be selected with this patch or all of the sub-patches therein have been processed until no discriminant points remain to be selected therein), then the pointer 63 moves down the stack 61 to patch 43, etc. Once processing of the patch 41 is completed, processing of patch 14 is complete, and the pointer 62 moves down to patch 13, etc. It should be noted that while a single processing stack 61 is shown in the illustrated example for clarity of illustration, in some implementations multiple processing stacks and/or processors may be used in parallel, as will be appreciated by those skilled in the art.

The above-described approach advantageously locates statistically significant tops and bottoms of features in a geographic scene without requiring intermediate interpolation. Also, "raw" LIDAR, etc., data points can be converted to a grid for processing and then mapped back to their original positions for more realistic geospatials. As will be appreciated by those skilled in the art, the above-described approach advantageously selects the most critical or statistically significant points within a geospatial data point set and builds a surface model that is within a parameterized error value (i.e., the threshold range) of any point in the original data set.

In some embodiments, it may be desirable to select vertical points, such as found at building edges, cliffs, etc., separate from the discriminant point selection so that these features are clearly delineated in the final DEM. For instance, this may be particularly advantageous for cities with tall buildings, or for mountainous regions (e.g., the Rocky Mountains) where there are many cliff features—this is the natural parallel to high-rise conditions in an urban setting. By way of example, vertical points can be found in a single pass using a local slope operator (at Block 33'), as will be appreciated by those skilled in the art. This may be done prior to discriminant point selection so that the vertical points are removed from consideration during the discriminant point selection processing. The selected discriminant points and selected vertical points (if any) are advantageously used to generate geospatial model, such as a T-TIN DEM, which is a thinned set of the original geospatial data points (Block 39').

Figure 7:
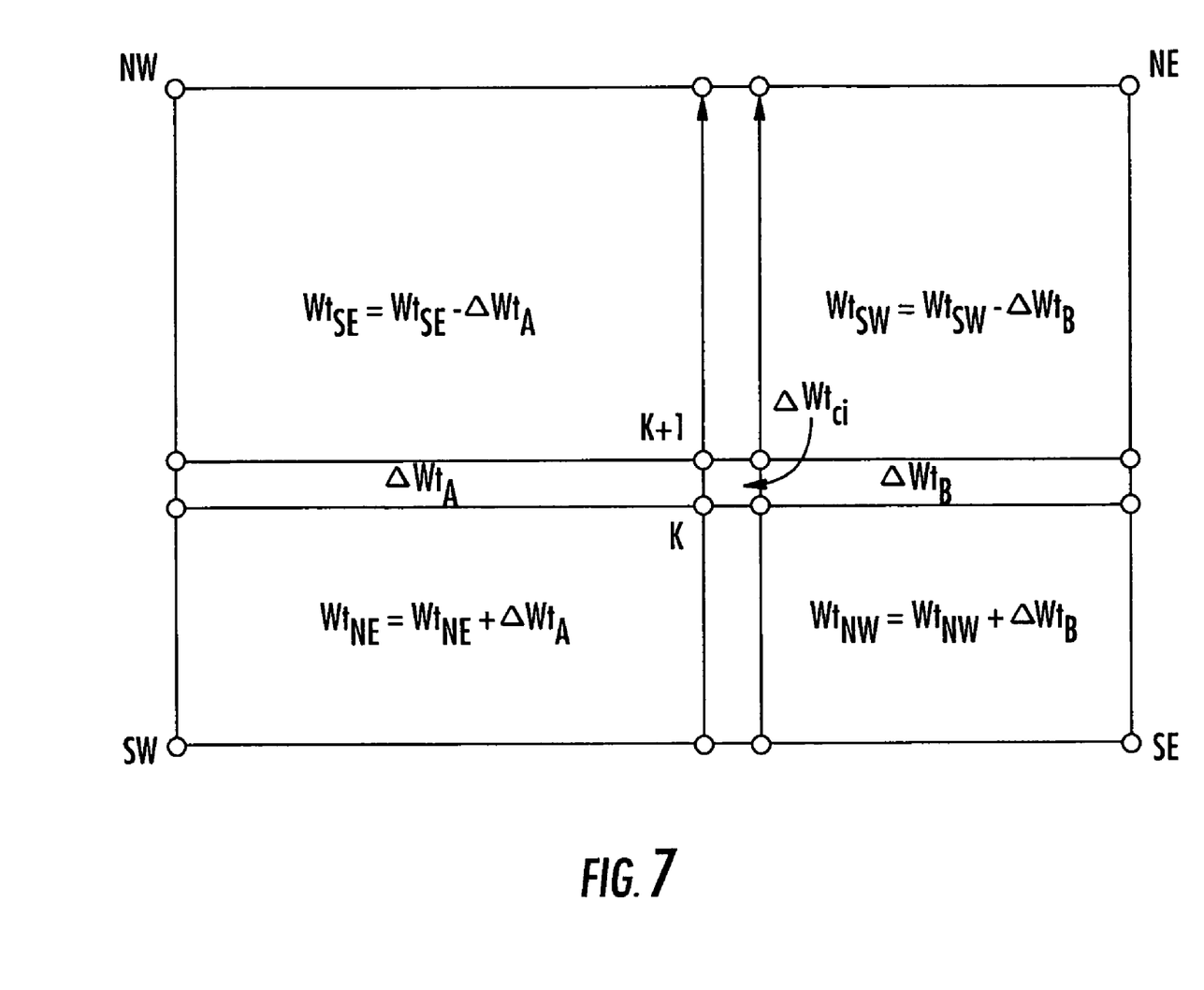
FIG. 7 is a schematic diagram of another geospatial data point patch illustrating bilinear processing operations in accordance with the present invention.
Figure 8A:
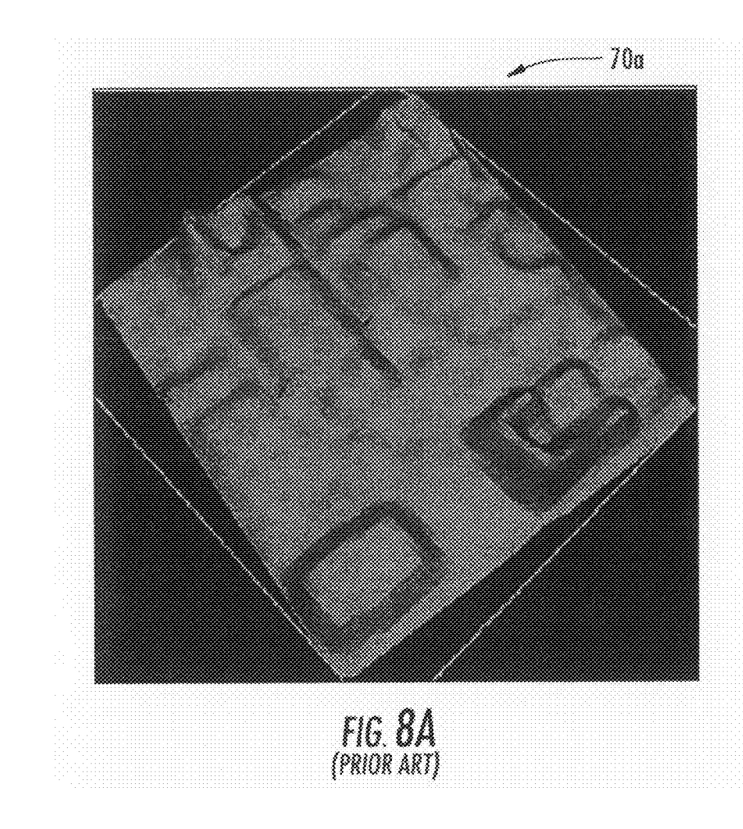
FIGS. 8A and 9A are exemplary T-TIN DEMs created based upon a prior art decimation data reduction process, and using a data thinning process in accordance with the present invention.
Figure 8B:
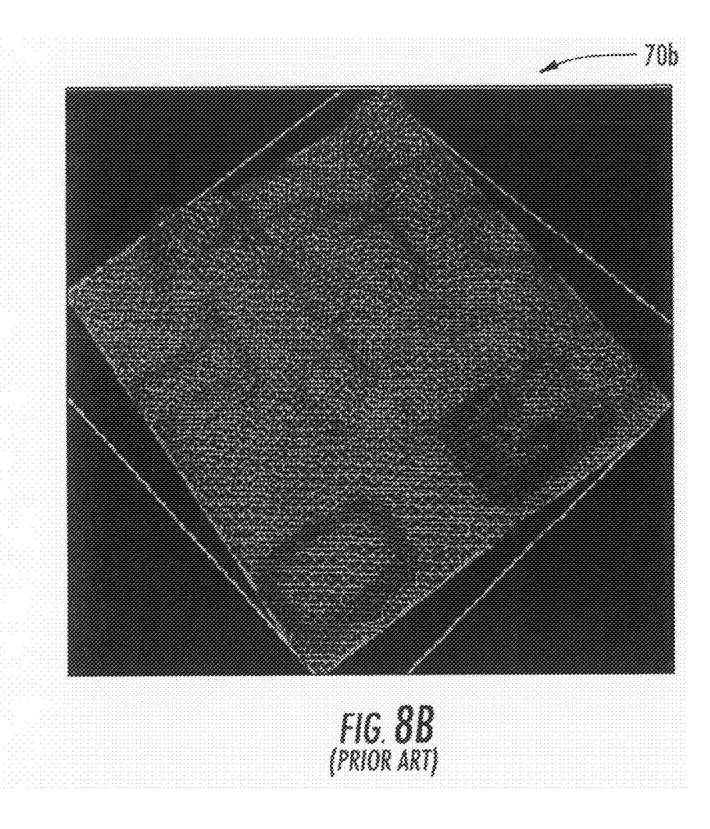
FIGS. 8B and 9B are the T-TINs of FIGS. 8A and 9A, respectively, with unfilled triangulated regions.

One advantageous approach for performing the bilinear weighting processing is now described with reference to FIG. 7. Given the regular nature of the geospatial data points, and the search pattern at each iteration k to k+1, a relatively efficient method of re-computing weights used to compute the discriminant value at k+1 is as follows. For a column including rows k to k+1, k+1 to k+2, . . . , $\Delta WtA$ and $\Delta WtB$ remain constant for the column. Moreover, between columns, incrementing and decrementing is performed by a column increment $c_i$ such that $\Delta Wt_A = \Delta Wt_A + \Delta Wt_{ci}$ and $\Delta Wt_B = \Delta Wt_B - \Delta Wt_{ci}$, as shown. With this approach, normalized weights are updated by a simple increment, which reduces the number of operations to four multiply operations and four addition operations as the method proceeds post to post. This compares to sixteen multiply operations and twenty-four addition operations for the traditional approach to interpolation.

Turning to FIGS. 8A, 8B, 9A and 9B, DEMs 70a and 70b (which are the same T-TIN DEM shown with and without filled triangular regions) created using a five meter decimation data thinning process in accordance with the prior art, versus DEMs 80a and 80b (which again are the same T-TIN DEM shown with and without filled triangular regions) created in accordance with the above-described method of the invention are shown. As can be seen, the prior art decimation approach used for the DEMS 70a, 70b results in rounded building edges and the loss of a significant amount of contour data. On the other hand, the DEMs 80a and 80b provide a much more realistic view of the original scene with desired edge point and contour data preservation, but with a comparable number of points to the decimation-thinned DEMs 70a and 70b. The DEM in 70a represents a 96% reduction (174,834 of 3,446,835 original HRDEM points) through simple decimation. The prescribed method reduced points by 95.2% (or 165448 points). In general reductions of 90-95% have been observed.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
   a geospatial database configured to store geospatial data points each having respective elevations associated therewith; and
   a processor configured to data thin the geospatial data points by selecting discriminant points therefrom, said processor selecting discriminant points based upon
   (a) identification of a current patch having a plurality of spaced-apart current geospatial data boundary points,
   (b) selection of a current discriminant point within the current patch based upon sequentially stepping through the geospatial data points therein to determine respective elevation differences relative to the current geospatial boundary points and comparing the elevation differences to a threshold range,
   (c) identification of a plurality of new patches, each having a plurality of spaced-apart new geospatial boundary points including the current discriminant point, and
   (d) an iterative repetition of steps (b) and (c) for each of the new patches until no further new discriminant point is selected.

2. The geospatial modeling system of claim 1 wherein said processor is further configured to generate a geospatial model based upon the discriminant points.

3. The geospatial modeling system of claim 2 wherein the geospatial model comprises a tiled triangulated irregular network (T-TIN) geospatial model.

4. The geospatial modeling system of claim 2 wherein said processor is further configured to select vertical points using a local slope operator (LSO); and wherein said processor is further configured to generate the geospatial model based upon the selected vertical points.

5. The geospatial modeling system of claim 4 wherein said processor is configured to determine the selected vertical points in an initial pass prior to selecting the discriminant points.

6. The geospatial modeling system of claim 1 wherein said processor is configured to determine the elevation differences based upon weighted bilinear processing.

7. The geospatial modeling system of claim 1 further comprising a display operatively connected to said processor.

8. A geospatial modeling system comprising:
   a geospatial database configured to store geospatial data points each having respective elevations associated therewith; and
   a processor configured to data thin the geospatial data points by selecting configured to vertical and discriminant points therefrom, said processor configured to vertical points using a local slope operator, said processor configured to select discriminant points based upon
   (a) identification of a current patch having a plurality of spaced-apart current geospatial data boundary points,
   (b) selection of a current discriminant point within the current patch based upon sequentially stepping through the geospatial data points therein to determine respective elevation differences relative to the current geospatial boundary points and comparing the elevation differences to a threshold range,
   (c) identification of a plurality of new patches, each having a plurality of spaced-apart new geospatial boundary points including the current discriminant point, and
   (d) an iterative repetition of steps (b) and (c) for each of the new patches until no further new discriminant point is selected;
   said processor being further configured to generate a geospatial model based upon the selected vertical points and the selected discriminant points.

9. The geospatial modeling system of claim 8 wherein the geospatial model comprises a tiled triangulated irregular network (T-TIN) geospatial model.

10. The geospatial modeling system of claim 8 wherein said processor is configured to select the vertical points in an initial pass prior to selecting the discriminant points.

11. The geospatial modeling system of claim 8 wherein said processor is configured to determine the elevation differences based upon weighted bilinear processing.

12. A geospatial modeling method comprising:
    providing geospatial data points each having respective elevations associated therewith; and
    data thinning the geospatial data points by
    (a) identifying a current patch having a plurality of spaced-apart current geospatial data boundary points,
    (b) selecting a current discriminant point within the current patch based upon sequentially stepping through the geospatial data points therein to determine respective elevation differences relative to the current geospatial boundary points and comparing the elevation differences to a threshold range,
    (c) identifying a plurality of new patches, each having a plurality of spaced-apart new geospatial boundary points including the current discriminant point, and
    (d) iteratively repeating steps (b) and (c) for each of the new patches until no further new discriminant point is selected.

13. The method of claim 12 further comprising generating a geospatial model based upon the discriminant points.

14. The method of claim 13 wherein the geospatial model comprises a tiled triangulated irregular network (T-TIN) geospatial model.

15. The method of claim 13 further comprising selecting vertical points using a local slope operator (LSO); and wherein generating the geospatial model further comprises generating the geospatial model based upon the selected vertical points.

16. The method of claim 15 wherein selecting the vertical points comprises selecting the vertical points in an initial pass prior to selecting the discriminant points.

17. The method of claim 12 wherein determining the elevation differences comprises determining the elevation differences based upon weighted bilinear processing.

* * * * *